(12) United States Patent
Mao et al.

(10) Patent No.: US 8,078,641 B2
(45) Date of Patent: Dec. 13, 2011

(54) ADJUSTING SPATIAL OPERATIONS BASED ON MAP DENSITY

(75) Inventors: Ailin Mao, Chino Hills, CA (US); Anatole Lokshin, Huntington Beach, CA (US); Nidhi Upparapalli, Diamond Bar, CA (US)

(73) Assignee: Mitac International Corporation, Kuei San Hsiang, Taoyuan (TW)

( * ) Notice: Subject to any disclaimer, the term of this patent is extended or adjusted under 35 U.S.C. 154(b) by 447 days.

(21) Appl. No.: 11/740,280

(22) Filed: Apr. 25, 2007

(65) Prior Publication Data
US 2008/0270468 A1    Oct. 30, 2008

(51) Int. Cl.
G06F 7/00 (2006.01)
G06F 17/30 (2006.01)

(52) U.S. Cl. ........................................ 707/796
(58) Field of Classification Search .................. None
See application file for complete search history.

(56) References Cited

U.S. PATENT DOCUMENTS

| | | |
|---|---|---|
| 5,515,283 A | 5/1996 | Desai et al. |
| 5,802,492 A | 9/1998 | DeLorme et al. |
| 5,926,118 A | 7/1999 | Hayashida et al. |
| 6,049,755 A | 4/2000 | Lou et al. |
| 6,067,502 A | 5/2000 | Hayashida et al. |
| 6,078,864 A | 6/2000 | Long et al. |
| 6,081,609 A | 6/2000 | Narioka |
| 6,084,989 A | 7/2000 | Eppler |
| 6,092,076 A | 7/2000 | McDonough et al. |
| 6,107,944 A | 8/2000 | Behr et al. |
| 6,108,603 A | 8/2000 | Karunanidhi |
| 6,108,604 A | 8/2000 | Fukaya et al. |
| 6,115,669 A | 9/2000 | Watanabe et al. |
| 6,124,826 A | 9/2000 | Garthwaite et al. |
| 6,125,326 A | 9/2000 | Ohmura et al. |
| 6,141,621 A | 10/2000 | Piwowarski et al. |
| 6,148,261 A | 11/2000 | Obradovich et al. |
| 6,151,552 A | 11/2000 | Koizumi et al. |
| 6,154,699 A | 11/2000 | Williams |
| 6,163,269 A | 12/2000 | Millington et al. |
| 6,172,641 B1 | 1/2001 | Millington |
| 6,175,801 B1 | 1/2001 | Millington |
| 6,177,943 B1 | 1/2001 | Margolin |

(Continued)

FOREIGN PATENT DOCUMENTS

EP    2017577    1/2009

(Continued)

OTHER PUBLICATIONS

Transaction History of related U.S. Appl. No. 12/016,980, filed Jan. 18, 2008, entitled "Method and Apparatus to Search for Local Parking."

(Continued)

*Primary Examiner* — Rehana Perveen
*Assistant Examiner* — Raheem Hoffler
(74) *Attorney, Agent, or Firm* — Winston Hsu; Scott Margo

(57) ABSTRACT

A method of determining density of a map is described along with an apparatus and computer-readable medium comprising instructions therefore. The method comprises determining one or more nodes of a quad tree applied to a map with which a predetermined query region intersects, calculating a cumulative data size of the query region based on a data size of the one or more intersecting nodes, and determining an average density of the query region based on the query region area and the cumulative data size.

27 Claims, 12 Drawing Sheets

U.S. PATENT DOCUMENTS

| | | |
|---|---|---|
| 6,178,380 B1 | 1/2001 | Millington |
| 6,184,823 B1 | 2/2001 | Smith et al. |
| 6,189,130 B1 | 2/2001 | Gofman et al. |
| 6,201,540 B1 | 3/2001 | Gallup et al. |
| 6,204,778 B1 | 3/2001 | Bergan et al. |
| 6,205,397 B1 | 3/2001 | Eslambolchi et al. |
| 6,212,474 B1 | 4/2001 | Fowler et al. |
| 6,223,118 B1 | 4/2001 | Kobayashi et al. |
| 6,229,546 B1 | 5/2001 | Lancaster et al. |
| 6,249,740 B1 | 6/2001 | Ito et al. |
| 6,253,151 B1 | 6/2001 | Ohler et al. |
| 6,256,029 B1 | 7/2001 | Millington |
| 6,278,942 B1 | 8/2001 | McDonough |
| 6,308,134 B1 | 10/2001 | Croyle et al. |
| 6,320,517 B1 | 11/2001 | Yano et al. |
| 6,321,158 B1 | 11/2001 | DeLorme et al. |
| 6,349,257 B1 | 2/2002 | Liu et al. |
| 6,356,210 B1 | 3/2002 | Ellis |
| 6,360,167 B1 | 3/2002 | Millington et al. |
| 6,362,751 B1 | 3/2002 | Upparapalli |
| 6,363,322 B1 | 3/2002 | Millington |
| 6,370,475 B1 | 4/2002 | Breed et al. |
| 6,377,278 B1 | 4/2002 | Curtright et al. |
| 6,381,536 B1 | 4/2002 | Satoh et al. |
| 6,385,535 B2 | 5/2002 | Ohishi et al. |
| 6,385,542 B1 | 5/2002 | Millington |
| 6,397,145 B1 | 5/2002 | Millington |
| 6,405,130 B1 | 6/2002 | Piwowarski |
| 6,408,243 B1 | 6/2002 | Yofu |
| 6,427,115 B1 | 7/2002 | Sekiyama |
| 6,430,501 B1 | 8/2002 | Slominski |
| 6,453,235 B1 | 9/2002 | Endo et al. |
| 6,484,089 B1 | 11/2002 | Millington |
| 6,487,494 B2 | 11/2002 | Odinak et al. |
| 6,515,595 B1 | 2/2003 | Obradovich et al. |
| 6,529,822 B1 | 3/2003 | Millington et al. |
| 6,529,824 B1 | 3/2003 | Obradovich et al. |
| 6,539,301 B1 | 3/2003 | Shirk |
| 6,542,814 B2 | 4/2003 | Polidi et al. |
| 6,565,610 B1 | 5/2003 | Wang et al. |
| 6,574,551 B1 | 6/2003 | Maxwell et al. |
| 6,609,062 B2 | 8/2003 | Hancock |
| 6,631,322 B1 | 10/2003 | Arthur et al. |
| 6,662,105 B1 | 12/2003 | Tada et al. |
| 6,671,617 B2 | 12/2003 | Odinak et al. |
| 6,704,649 B2 | 3/2004 | Miyahara |
| 6,728,608 B2 * | 4/2004 | Ollis et al. ............ 701/28 |
| 6,728,636 B2 | 4/2004 | Kokijima et al. |
| 6,748,323 B2 | 6/2004 | Lokshin et al. |
| 6,765,554 B2 | 7/2004 | Millington |
| 6,774,932 B1 | 8/2004 | Ewing |
| 6,782,319 B1 | 8/2004 | McDonough |
| 6,816,596 B1 | 11/2004 | Peinado et al. |
| 6,819,301 B2 | 11/2004 | Nagamatsu et al. |
| 6,842,695 B1 | 1/2005 | Tu |
| 6,873,907 B1 | 3/2005 | Millington et al. |
| 6,885,874 B2 | 4/2005 | Grube et al. |
| 6,917,982 B1 | 7/2005 | Dueck et al. |
| 6,938,028 B1 | 8/2005 | Ito |
| 7,031,834 B2 | 4/2006 | Ito et al. |
| 7,031,836 B2 | 4/2006 | Branch |
| 7,058,504 B2 | 6/2006 | McDonough |
| 7,170,518 B1 | 1/2007 | Millington et al. |
| 7,233,860 B2 | 6/2007 | Lokshin et al. |
| 7,260,475 B2 | 8/2007 | Suzuki |
| 7,321,826 B2 | 1/2008 | Sheha et al. |
| 7,333,820 B2 | 2/2008 | Sheha et al. |
| 7,343,242 B2 | 3/2008 | Breitenberger et al. |
| 7,353,107 B2 | 4/2008 | Breitenberger et al. |
| 7,379,812 B2 * | 5/2008 | Yoshioka et al. ............ 701/208 |
| 7,421,334 B2 | 9/2008 | Dahlgren |
| 7,512,487 B1 | 3/2009 | Golding et al. |
| 7,546,202 B2 | 6/2009 | Oh |
| 7,590,490 B2 | 9/2009 | Clark |
| 2001/0018628 A1 | 8/2001 | Jenkins et al. |
| 2002/0151315 A1 | 10/2002 | Hendrey |
| 2003/0036842 A1 | 2/2003 | Hancock |
| 2003/0036848 A1 | 2/2003 | Sheha et al. |
| 2003/0167120 A1 | 9/2003 | Kawasaki |
| 2003/0182052 A1 | 9/2003 | DeLorme et al. |
| 2003/0191578 A1 | 10/2003 | Paulauskas et al. |
| 2004/0049337 A1 | 3/2004 | Knockeart et al. |
| 2005/0107948 A1 | 5/2005 | Catalinotto |
| 2006/0080031 A1 | 4/2006 | Cooper et al. |
| 2006/0089788 A1 | 4/2006 | Laverty |
| 2006/0106534 A1 * | 5/2006 | Kawamata et al. ............ 701/208 |
| 2006/0212217 A1 | 9/2006 | Sheha et al. |
| 2006/0265422 A1 | 11/2006 | Ando et al. |
| 2007/0027628 A1 | 2/2007 | Geelen |
| 2007/0073480 A1 | 3/2007 | Singh |
| 2007/0088494 A1 | 4/2007 | Rothman et al. |
| 2007/0130153 A1 | 6/2007 | Nachman et al. |
| 2007/0204218 A1 | 8/2007 | Weber et al. |
| 2007/0213929 A1 | 9/2007 | Tanizaki et al. |
| 2007/0233384 A1 | 10/2007 | Lee et al. |
| 2008/0010605 A1 * | 1/2008 | Frank ............ 715/765 |
| 2008/0076451 A1 | 3/2008 | Sheha et al. |
| 2008/0125958 A1 | 5/2008 | Boss et al. |
| 2008/0133120 A1 | 6/2008 | Romanick |
| 2008/0134088 A1 | 6/2008 | Tse et al. |
| 2008/0177470 A1 | 7/2008 | Sutardja |
| 2008/0228754 A1 * | 9/2008 | Frank et al. ............ 707/5 |
| 2008/0270016 A1 | 10/2008 | Proietty et al. |
| 2009/0138190 A1 | 5/2009 | Kulik |
| 2009/0150064 A1 | 6/2009 | Geelen |
| 2009/0171584 A1 | 7/2009 | Liu |
| 2009/0182498 A1 | 7/2009 | Seymour |
| 2009/0182500 A1 * | 7/2009 | Dicke ............ 701/208 |
| 2009/0187340 A1 | 7/2009 | Vavrus |
| 2009/0187341 A1 | 7/2009 | Vavrus |
| 2009/0187342 A1 | 7/2009 | Vavrus |

FOREIGN PATENT DOCUMENTS

| | | |
|---|---|---|
| JP | 02140788 A | 5/1990 |
| JP | 2001194172 | 7/2001 |
| JP | 2002048574 | 2/2002 |
| JP | 2006250875 | 9/2006 |
| JP | 2007155582 | 6/2007 |
| JP | 2007178182 | 7/2007 |
| JP | 2008002978 | 1/2008 |
| KR | 19990011004 | 2/1999 |
| KR | 19990040849 | 6/1999 |
| KR | 20020084716 | 11/2002 |
| KR | 20040106688 | 12/2004 |
| KR | 20070080726 | 8/2007 |

OTHER PUBLICATIONS

Transaction History of related U.S. Appl. No. 12/016,982, filed Jan. 18, 2008, entitled "Method and Apparatus for Access Point Recording Using a Position Device."

Transaction History of related U.S. Appl. No. 12/188,139, filed Aug. 7, 2008, entitled "System and Method to Record a Present Trip."

Transaction History of related U.S. Appl. No. 12/192,018, filed Aug. 14, 2008, entitled "Route Navigation via a Proximity Point."

Transaction History of related U.S. Appl. No. 12/195,152, filed Aug. 20, 2008, entitled "Systems and Methods for Smart City Search."

International Patent Application No. PCT/US2008/084659, Written Opinion and International Search Report, Apr. 28, 2009.

International Patent Application No. PCT/US2009/030177, Written Opinion and International Search Report, Apr. 29, 2009.

International Patent Application No. PCT/US2009/030314, Written Opinion and International Search Report, May 25, 2009.

Shamir, Adi et al., "Playing 'Hide and Seek' with Stored Keys," Lecture Notes in Computer Science, vol. 1648, 1991, pp. 118-124.

Transaction History of related U.S. Appl. No. 08/691,663, filed Aug. 2, 1996, entitled "Method Providing a Textual Description of a Remote Vehicle Location," now U.S. Patent No. 6,141,621.

Transaction History of related U.S. Appl. No. 08/691,727, filed Aug. 2, 1996, entitled "System and Method for Controlling a Vehicle Emergency Response Network," now U.S. Patent No. 6,539,301.

Transaction History of related U.S. Appl. No. 08/710,473, filed Sep. 18, 1996, entitled "Navigation Simulator and Recorder," now U.S. Patent No. 5,922,041.

Transaction History of related U.S. Appl. No. 08/713,625, filed Sep. 13, 1996, entitled "Navigation System With Vehicle Service Information," now U.S. Patent No. 5,819,201.
Transaction History of related U.S. Appl. No. 08/713,627, filed Sep. 13, 1996, entitled "Navigation System With User Definable Cost Values," now U.S. Patent No. 5,878,368.
Transaction History of related U.S. Appl. No. 08/762,012, filed Dec. 11, 1996, entitled "Navigation System With Forward Looking Origin Selection for Route Re-Calculation," now U.S. Patent No. 6,405,130.
Transaction History of related U.S. Appl. No. 09/037,772, filed Mar. 10, 1998, entitled "Navigation System Character Input Device," now U.S. Patent No. 6,037,942.
Transaction History of related U.S. Appl. No. 09/056,218, filed Apr. 7, 1998, entitled "Navigation System using Position Network for Map Matching," now U.S. Patent No. 6,108,603.
Transaction History of related U.S. Appl. No. 09/062,518, filed Apr. 17, 1998, entitled "3-Dimensional Intersection Display for Vehicle Navigation System," now U.S. Patent No. 6,611,753.
Transaction History of related U.S. Appl. No. 09/096,103, filed Jun. 11, 1998, entitled "Navigation System With a Route Exclusion List System," now U.S. Patent No. 6,362,751.
Transaction History of related U.S. Appl. No. 09/099,963, filed Jun. 19, 1998, entitled "Autoscaling of Recommended Route," now U.S. Patent No. 6,574,551.
Transaction History of related U.S. Appl. No. 09/100,683, filed Jun. 19, 1998, entitled "Navigation System Map Panning Directional Indicator," now U.S. Patent No. 6,175,801.
Transaction History of related U.S. Appl. No. 09/114,670, filed Jul. 13, 1998, entitled "Navigation System Vehicle Location Display," now U.S. Patent No. 6,049,755.
Transaction History of related U.S. Appl. No. 09/118,030, filed Jul. 17, 1998, entitled "Navigation System With Predetermined Indication of Next Maneuver," now U.S. Patent No. 6,078,684.
Transaction History of related U.S. Appl. No. 09/160,068, filed Sep. 24, 1998, entitled "Navigation System With Anti-Alias Map Display," now U.S. Patent No. 6,163,269.
Transaction History of related U.S. Appl. No. 09/176,630, filed Oct. 22, 1998, entitled "Street Identification for a Map Zoom of a Navigation System," now U.S. Patent No. 6,178,380.
Transaction History of related U.S. Appl. No. 09/239,692, filed Jan. 29, 1999, entitled "Vehicle Navigation System With Location Based Multi-Media Annotation," now U.S. Patent No. 6,360,167.
Transaction History of related U.S. Appl. No. 09/418,749, filed Oct. 15, 1999, entitled "Navigation System With Road Condition Sampling," now U.S. Patent No. 6,484,089.
Transaction History of related U.S. Appl. No. 09/435,381, filed Nov. 5, 1999, entitled "Navigation System Character Input Device," now U.S. Patent No. 6,765,554.
Transaction History of related U.S. Appl. No. 09/470,438, filed Dec. 22, 1999, entitled "Navigation System With All Character Support," now U.S. Patent No. 6,256,029.
Transaction History of related U.S. Appl. No. 09/470,441, filed Dec. 22, 1999, entitled "Navigation System With Unique Audio Tones for Maneuver Notification," now U.S. Patent No. 6,363,322.
Transaction History of related U.S. Appl. No. 09/487,654, filed Jan. 19, 2000, entitled "Navigation System With Route Indicators," now U.S. Patent No. 6,430,501.
Transaction History of related U.S. Appl. No. 09/519,143, filed Mar. 6, 2000, entitled "Navigation System With Complex Maneuver Instruction," now U.S. Patent No. 6,397,145.
Transaction History of related U.S. Appl. No. 09/535,733, filed Mar. 27, 2000, entitled "Selective Rendering of Cartographic Entities for Navigation System," now U.S. Patent No. 7,170,518.
Transaction History of related U.S. Appl. No. 09/547,004, filed Apr. 11, 2000, entitled "Navigation System With Zoomed Maneuver Instruction," now U.S. Patent No. 6,529,822.
Transaction History of related U.S. Appl. No. 09/661,982, filed Sep. 18, 2000, entitled "Points of Interest for Navigation System," now U.S. Patent No. 6,374,180.
Transaction History of related U.S. Appl. No. 09/679,671, filed Oct. 5, 2000, entitled "Navigation System With Run-Time Training Instruction," now abandoned.
Transaction History of related U.S. Appl. No. 09/691,531, filed Oct. 18, 2000, entitled "Multiple Configurations for a Vehicle Navigation System," now U.S. Patent No. 6,385,542.
Transaction History of related U.S. Appl. No. 09/799,876, filed Mar. 6, 2001, entitled "Navigation System With Figure of Merit Determination," now U.S. Patent No. 6,741,928.
Transaction History of related U.S. Appl. No. 10/088,017, filed Sep. 9, 2002, entitled "Navigation System With User Interface," now U.S. Patent No. 6,873,907.
Transaction History of related U.S. Appl. No. 10/208,261, filed Jul. 31, 2002, entitled "Displaying Data," now U.S. Patent No. 6,748,323.
Transaction History of related U.S. Appl. No. 10/619,619, filed Jul. 16, 2003, entitled "Intelligent Modular Navigation Information Capability," now U.S. Patent No. 7,233,860.
Transaction History of related U.S. Appl. No. 11/327,450, filed Jan. 9, 2006, entitled "Smart Detour."
Transaction History of related U.S. Appl. No. 11/518,205, filed Sep. 11, 2006, entitled "Method and System of Securing Content and Destination of Digital Download Via the Internet."
Transaction History of related U.S. Appl. No. 11/675,817, filed Feb. 16, 2007, entitled "A Method of Generating Curved Baseline for Map Labeling."
Transaction History of related U.S. Appl. No. 11/684,301, filed Mar. 9, 2007, entitled "Method and Apparatus for Determining a Route Having an Estimated Minimum Fuel Usage for a Vehicle."
Transaction History of related U.S. Appl. No. 11/737,125, filed Apr. 18, 2007, entitled "Method and System Navigation Using GPS Velocity Vector."
Transaction History of related U.S. Appl. No. 11/840,610, filed Aug. 17, 2007, entitled "Methods and Apparatus for Measuring the Effectiveness of Advertisements Presented on a Mobile Navigation Device."
Transaction History of related U.S. Appl. No. 11/844,321, filed Aug. 23, 2007, entitled "Rerouting in Vehicle Navigation Systems."
Transaction History of related U.S. Appl. No. 11/852,973, filed Sep. 10, 2007, entitled "Nearest Neighbor Geographic Search."
Transaction History of related U.S. Appl. No. 11/906,277, filed Oct. 1, 2007, entitled "Static and Dynamic Contours."
Transaction History of related U.S. Appl. No. 11/945,211, filed Nov. 26, 2007, entitled "System and Method of Providing Traffic Data to a Mobile Device."
Transaction History of related U.S. Appl. No. 11/967,889, filed Jan. 1, 2008, entitled "System and Method for Accessing a Navigation System."
Transaction History of related U.S. Appl. No. 12/013,384, filed Jan. 11, 2008, entitled "System and Method to Provide Navigational Assistance Using an Online Social Network."
Transaction History of related U.S. Appl. No. 12/016,949, filed Jan. 18, 2008, entitled "Method and Apparatus for Hybrid Routing Using Breadcrumb Paths."
Transaction History of related U.S. Appl. No. 12/016,980, filed Jan. 18, 2008, entitled "Method and Apparatus to Search for Local Parking."
USPTO Transaction History of related U.S. Appl. No. 12/195,152, filed Aug. 20, 2008, entitled "Systems and Methods for Smart City Search."
International Patent Application Serial No. PCT/US2009/030176, Written Opinion and International Search Report, mailed Sep. 1, 2009.
USPTO Tranaction History of related U.S. Appl. No. 08/691,663, filed Aug. 2, 1996, entitled "Method Providing a Textual Description of a Remote Vehicle Location," now U.S. Patent No. 6,141,621.
USPTO Transaction History of a related U.S. Appl. No. 08/691,727, filed Aug. 2, 1996, entitled "System and Method for Controlling a Vehicle Emergency Response Network," now U.S. Patent No. 6,539,301.
USPTO Transaction History of related U.S. Appl. No. 08/710,473, filed Sep. 18, 1996, entitled "Navigation Simulator and Recorder," now U.S. Patent No. 5,922,041.
USPTO Transaction History of relatedd U.S. Appl. No. 08/713,625, filed Sep. 13, 1996, entitled "Navigation System With Vehicle Service Information," now U.S. Patent No. 5,819,201.

USPTO Transaction History of related U.S. Appl. No. 08/713,627, filed Sep. 13, 1996, entitled "Navigation System With User Definable Cost Values," now U.S. Patent No. 5,878,368.

USPTO Transaction History of related U.S. Appl. No. 08/762,012, filed Dec. 11, 1996, entitled "Navigation System With Forward Looking Origin Selection for Route Re-Calculation," now U.S. Patent No. 6,405,130.

USPTO Transaction History of related U.S. Appl. No. 09/037,772, filed Mar. 10, 1998, entitled "Navigation System Character Input Device," now U.S. Patent No. 6,037,942.

USPTO Transaction History of related U.S. Appl. No. 09/056,218, filed Apr. 7, 1998, entitled "Navigation System using Position Network for Map Matching," now U.S. Patent No. 6,108,603.

USPTO Transaction History of related U.S. Appl. No. 09/062,518, filed Apr. 17, 1998, entitled "3-Dimensional Intersection Display for Vehicle Navigation System," now U.S. Patent No. 6,611,753.

USPTO Transaction History of related U.S. Appl. No. 09/096,103, filed Jun. 11, 1998, entitled "Navigation System With a Route Exclusion List System," now U.S. Patent No. 6,362,751.

USPTO Transaction History of related U.S. Appl. No. 09/099,963, filed Jun. 19, 1998, entitled "Autoscaling of Recommended Route," now U.S. Patent No. 6,574,551.

USPTO Transaction History of related U.S. Appl. No. 09/100,683, filed Jun. 19, 1998, entitled "Navigation System Map Panning Directional Indicator," now U.S. Patent No. 6,175,801.

USPTO Transaction History of related U.S. Appl. No. 09/114,670, filed Jul. 13, 1998, entitled "Navigation System Vehicle Location Display," now U.S. Patent No. 6,049,755.

USPTO Transaction History of related U.S. Appl. No. 09/118,030, filed Jul. 17, 1998, entitled "Navigation System With Predetermined Indication of Next Maneuver," now U.S. Patent No. 6,078,684.

USPTO Transaction History of related U.S. Appl. No. 09/160,068, filed Sep. 24, 1998, entitled "Navigation System With Anti-Alias Map Display," now U.S. Patent No. 6,163,269.

USPTO Transaction History of related U.S. Appl. No. 09/176,630, filed Oct. 22, 1998, entitled "Street Identification for a Map Zoom of a Navigation System," now U.S. Patent No. 6,178,380.

USPTO Transaction History of related U.S. Appl. No. 09/239,692, filed Jan. 29, 1999, entitled "Vehicle Navigation System With Location Based Multi-Media Annotation," now U.S. Patent No. 6,360,167.

USPTO Transaction History of related U.S. Appl. No. 09/418,749, filed Oct. 15, 1999, entitled "Navigation System With Road Condition Sampling," now U.S. Patent No. 6,484,089.

USPTO Transaction History of related U.S. Appl. No. 09/435,381, filed Nov. 5, 1999, entitled "Navigation System Character Input Device," now U.S. Patent No. 6,765,554.

USPTO Transaction History of related U.S. Appl. No. 09/470,438, filed Dec. 22, 1999, entitled "Navigation System With All Character Support," now U.S. Patent No. 6,256,029.

USPTO Transaction History of related U.S. Appl. No. 09/470,441, filed Dec. 22, 1999, entitled "Navigation System With Unique Audio Tones for Maneuver Notification," now U.S. Patent No. 6,363,322.

USPTO Transaction History of related U.S. Appl. No. 09/487,654, filed Jan. 19, 2000, entitled "Navigation System With Route Indicators," now U.S. Patent No. 6,430,501.

USPTO Transaction History of related U.S. Appl. No. 09/519,143, filed Mar. 6, 2000, entitled "Navigation System With Complex Maneuver Instruction," now U.S. Patent No. 6,397,145.

USPTO Transaction History of related U.S. Appl. No. 09/535,733, filed Mar. 27, 2000, entitled "Selective Rendering of Cartographic Entities for Navigation System," now U.S. Patent No. 7,170,518.

USPTO Transaction History of related U.S. Appl. No. 09/547,004, filed Apr. 11, 2000, entitled "Navigation System With Zoomed Maneuver Instruction," now U.S. Patent No. 6,529,822.

USPTO Transaction History of related U.S. Appl. No. 09/661,982, filed Sep. 18, 2000, entitled "Points of Interest for Navigation System," now U.S. Patent No. 6,374,180.

USPTO Transaction History of related U.S. Appl. No. 09/679,671, filed Oct. 5, 2000, entitled "Navigation System With Run-Time Training Instruction," now abandoned.

USPTO Transaction History of related U.S. Appl. No. 09/691,531, filed Oct. 18, 2000, entitled "Multiple Configurations for a Vehicle Navigation System," now U.S. Patent No. 6,385,542.

USPTO Transaction History of related U.S. Appl. No. 09/799,876, filed Mar. 6, 2001, entitled "Navigation System With Figure of Merit Determination," now U.S. Patent No. 6,741,928.

USPTO Transaction History of related U.S. Appl. No. 10/088,017, filed Sep. 9, 2002, entitled "Navigation System With User Interface," now U.S. Patent No. 6,873,907.

USPTO Transaction History of related U.S. Appl. No. 10/208,261, filed Jul. 31, 2002, entitled "Displaying Data," now U.S. Patent No. 6,748,323.

USPTO Transaction History of related U.S. Appl. No. 10/619,619, filed Jul. 16, 2003, entitled "Intelligent Modular Navigation Information Capability," now U.S. Patent No. 7,233,860.

USPTO Transaction History of related U.S. Appl. No. 11/327,450, filed Jan. 9, 2006, entitled "Smart Detour."

USPTO Transaction History of related U.S. Appl. No. 11/518,205, filed Sep. 11, 2006, entitled "Method and System of Securing Content and Destination of Digital Download Via the Internet."

USPTO Transaction History of related U.S. Appl. No. 11/675,817, filed Feb. 16, 2007, entitled "A Method of Generating Curved Baseline for Map Labeling."

USPTO Transaction History of related U.S. Appl. No. 11/684,301, filed Mar. 9, 2007, entitled "Method and Apparatus for Determining a Route Having an Estimated Minimum Fuel Usage for a Vehicle."

USPTO Transaction History of related U.S. Appl. No. 11/737,125, filed Apr. 18, 2007, entitled "Method and System Navigation Using GPS Velocity Vector."

USPTO Transaction History of related U.S. Appl. No. 11/840,610, filed Aug. 17, 2007, entitled "Methods and Apparatus for Measuring the Effectiveness of Advertisements Presented on a Mobile Navigation Device."

USPTO Transaction History of related U.S. Appl. No. 11/844,321, filed Aug. 23, 2007, entitled "Rerouting in Vehicle Navigation Systems."

USPTO Transaction History of related U.S. Appl. No. 11/852,973, filed Sep. 10, 2007, entitled "Nearest Neighbor Geographic Search."

USPTO Transaction History of related U.S. Appl. No. 11/906,277, filed Oct. 1, 2007, entitled "Static and Dynamic Contours."

USPTO Transaction History of related U.S. Appl. No. 11/945,211, filed Nov. 26, 2007, entitled "System and Method of Providing Traffic Data to a Mobile Device."

USPTO Transaction History of related U.S. Appl. No. 11/967,889, filed Jan. 1, 2008, entitled "System and Method for Accessing a Navigation System."

USPTO Transaction History of related U.S. Appl. No. 12/013,384, filed Jan. 11, 2008, entitled "System and Method to Provide Navigational Assistance Using an Online Social Network."

USPTO Transaction History of related U.S. Appl. No. 12/016,949, filed Jan. 18, 2008, entitled "Method and Apparatus for Hybrid Routing Using Breadcrumb Paths."

USPTO Transaction History of related U.S. Appl. No. 12/016,980, filed Jan. 18, 2008, entitled "Method and Apparatus to Search for Local Parking."

USPTO Transaction History of related U.S. Appl. No. 12/016,982, filed Jan. 18, 2008, entitled "Method and Apparatus for Access Point Recording Using a Position Device."

USPTO Transaction History of related U.S. Appl. No. 12/188,139, filed Aug. 7, 2008, entitled "System and Method to Record a Present Trip."

USPTO Transaction History of related U.S. Appl. No. 12/192,018, filed Aug. 14, 2008, entitled "Route Navigation via a Proximity Point."

International Application No. PCT/US09/30322, International Search Report and Written Opinion, Aug. 31, 2009.

PCT/US08/51019—International Search Report (mailed Jun. 26, 2008).

PCT/US08/51019—Written Opinion (mailed Jun. 26, 2008).

* cited by examiner

FIG. 13a
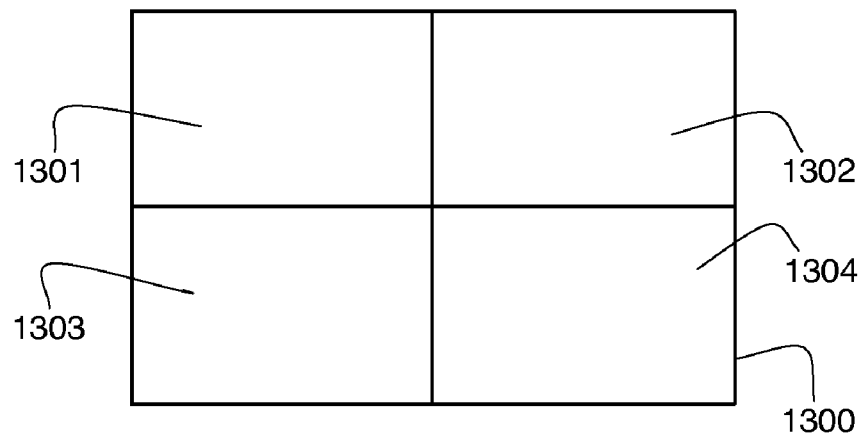
FIG. 13b
| 1305 | 1306 | 1309 | 1310 |
| --- | --- | --- | --- |
| 1307 | 1308 | 1311 | 1312 |
| 1313 | 1314 | 1317 | 1318 |
| 1315 | 1316 | 1319 | 1320 |
FIG. 13c

ADJUSTING SPATIAL OPERATIONS BASED ON MAP DENSITY

BACKGROUND

Mobile mapping applications, e.g., mapping applications for execution on mobile devices such as global positioning system (GPS)-based devices, are often executed on computer-based platforms having a slower central processing unit (CPU) and limited memory in comparison to desktop computer-based platforms. Upfront knowledge of mobile mapping application resource requirements, e.g., CPU speed, memory space, etc., enables better use of the limited resources available on the computer-based platforms, improves performance of the application and provides an improved user experience during interaction with the application.

In mobile mapping applications, many spatial operations, e.g., map display, nearest search and street routing, depend on map density. Map density refers to the amount of information and/or features displayed on a given area of a displayed map. For example, it is not desirable to have too crowded map views which reduce screen readability and increase the time to update the view. At the same time, it is not desirable to have map views with very few features and which do not provide enough navigation information. The problem can be critical for mobile devices having small screens.

The map display detail level, i.e., the amount of features displayed, at a given scale is defined either in the application software or the map database. Users may be provided with a mechanism to manually adjust the map display detail level. In such situations, the setting is constant everywhere in a given map. In reality, the density of a given feature type is not evenly distributed around the world, e.g., there are many more roads per square mile in urban areas than in rural areas. The non-uniformity of feature density increases map developers difficulty in designing map views which work well both in urban areas and rural areas.

Prior approaches predefine at the time of map creation which class of features is displayed at different scales. Because the class of features is predefined for the entire map, by its nature it has to be an average and may be too dense or too sparse for some regions of the map. To adjust these possible mismatches of density, the user is provided with a user interface (UI) that allows the user to change which class of features is displayed at a particular level. Therefore, when the user is dissatisfied with the feature density displayed on the map at a particular location at a particular zoom level, the user can manipulate the UI and change the display level explicitly to be more or less dense.

The prior approach is extremely cumbersome for users especially if a mapping device is used while driving, biking, or any other similar activity when the user's hands and attention may be occupied.

Street routing algorithms also suffer from a non-uniformity of feature density. Street routing may be based on a type of greedy algorithm in which roads are divided into several function classes depending on the importance of the roads, e.g., surface roads, highways, etc. Roads in a given function class and all higher level function classes comprise a connected road network. In order to quickly find a street route between two far away points, a route search engine needs to only examine important roads, e.g., freeways, as soon as possible. In order to maintain route quality, such jumps from local streets to major roads such as highways and freeways have to meet some criteria. Prior approaches predefine the criteria constant everywhere in a given map thereby making the routing algorithm impossible to generate street routes with optimal quality and search time in both urban and rural areas.

In another case, personal navigation devices usually have a nearest (proximity) search function, which allow users to find specific types of objects near a reference point (e.g., the current position). Feature density varies by location and feature type. If a predefined search radius is used, the nearest search function may yield no result, too many results, or take too much time. Even if the search radius is adjusted based on search results, each search iteration can take significant time.

SUMMARY OF THE INVENTION

It is, therefore, an object of the present invention to resolve one or more of the foregoing difficulties by providing a method that automatically keeps the similar density of the displayed map features by deciding in real time which features should be displayed at a given location and zoom level.

This auto adjustment may be achieved by efficiently estimating in real time map density for different possible combination of map features and displaying the best found feature combination.

These and other objects of the present invention are achieved by a method of determining density of a map comprising: determining one or more nodes of a quad tree applied to a map with which a predetermined query region intersects, calculating a cumulative data size of the query region based on a data size of the one or more intersecting nodes; and determining a density of the query region based on the query region area and the cumulative data size.

The foregoing and other objects of the invention are achieved by a mobile computer device for determining density of a map, the device comprising: a processor; a memory communicatively coupled with the processor and comprising a set of instructions which, when executed by the processor, cause the processor to: determine one or more nodes of a quad tree applied to a map with which a predetermined query region intersects, calculate a cumulative data size of the query region based on a data size of the one or more intersecting nodes, and determine a density of the query region based on the query region area and the cumulative data size.

The foregoing and other objects of the invention are achieved by a computer-readable medium storing instructions which, when executed by a processor, cause the processor to determine one or more nodes of a quad tree applied to a map with which a predetermined query region intersects, calculate a cumulative data size of the query region based on a data size of the one or more intersecting nodes, and determine a density of the query region based on the query region area and the cumulative data size.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments and its several details are capable of modifications in various obvious respects, all without departing from the invention. Accordingly, the drawings and description thereof are to be regarded as illustrative in nature, and not as restrictive.

DESCRIPTION OF THE DRAWINGS

The present invention is illustrated by way of example, and not by limitation, in the figures of the accompanying drawings, wherein elements having the same reference numeral designations represent like elements throughout and wherein:

FIGS. 13a-c are diagrams of exemplary quad trees according to an embodiment;

DETAILED DESCRIPTION

A method and an apparatus for estimating map density are described along with automatically retaining a similar density of displayed map features by adjusting in real time visible features at a given location and zoom level. Methods automatically adjusting street routing and nearest (proximity) search are also described. In at least some embodiments, the adjustment of map display density, street routing and nearest search may be performed in an optimal and/or efficient manner. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
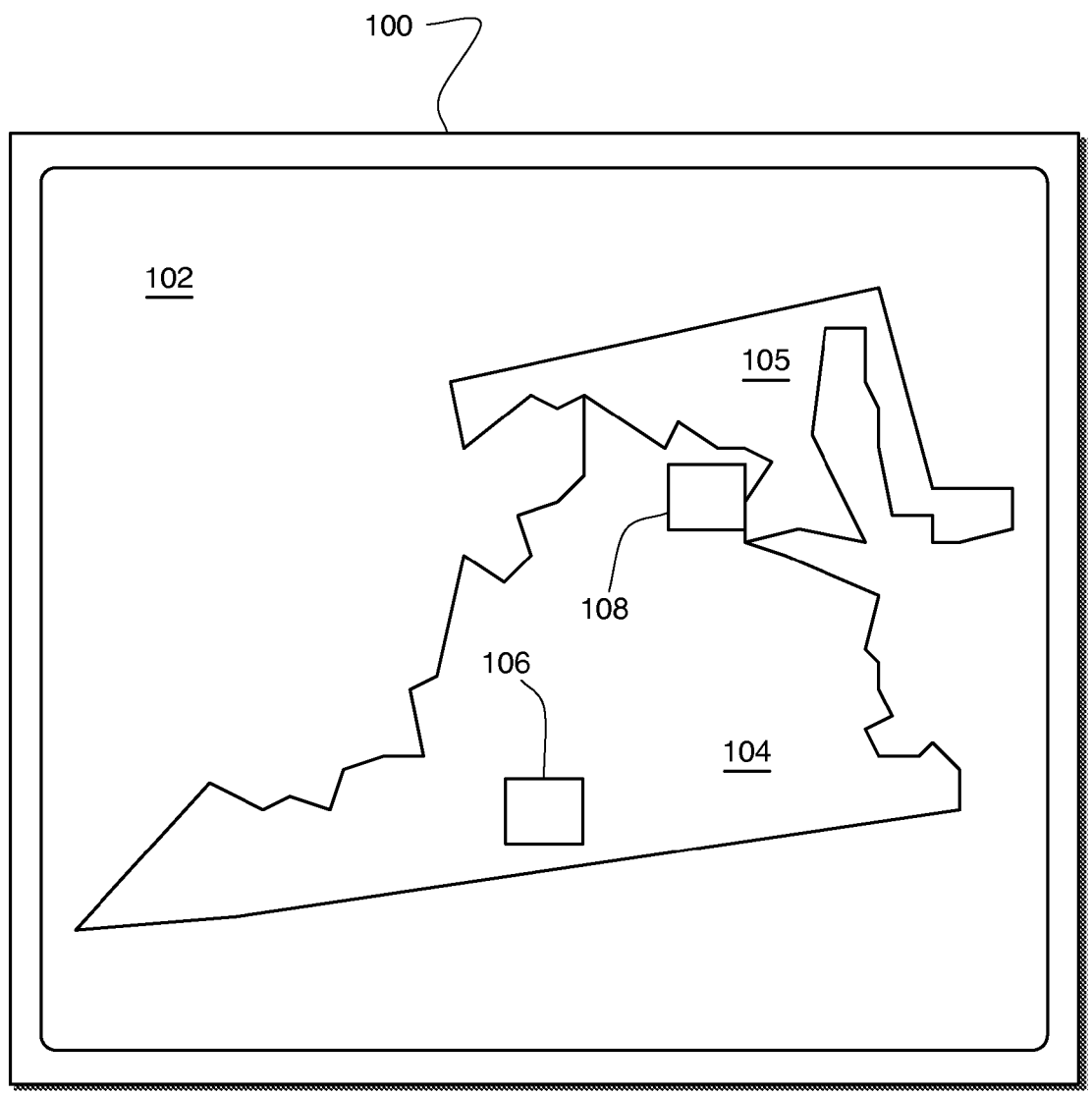
FIG. 1 is a display useable in conjunction with an embodiment according to the present invention.
Figure 2:
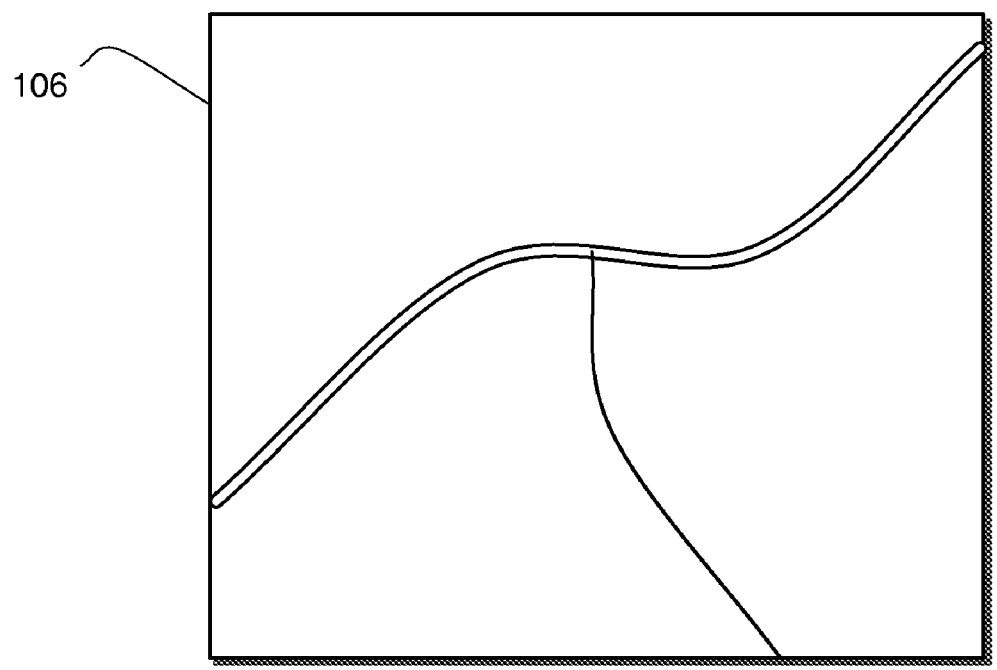
FIG. 2 is a display of a portion of the FIG. 1 display according to an embodiment.
Figure 3:
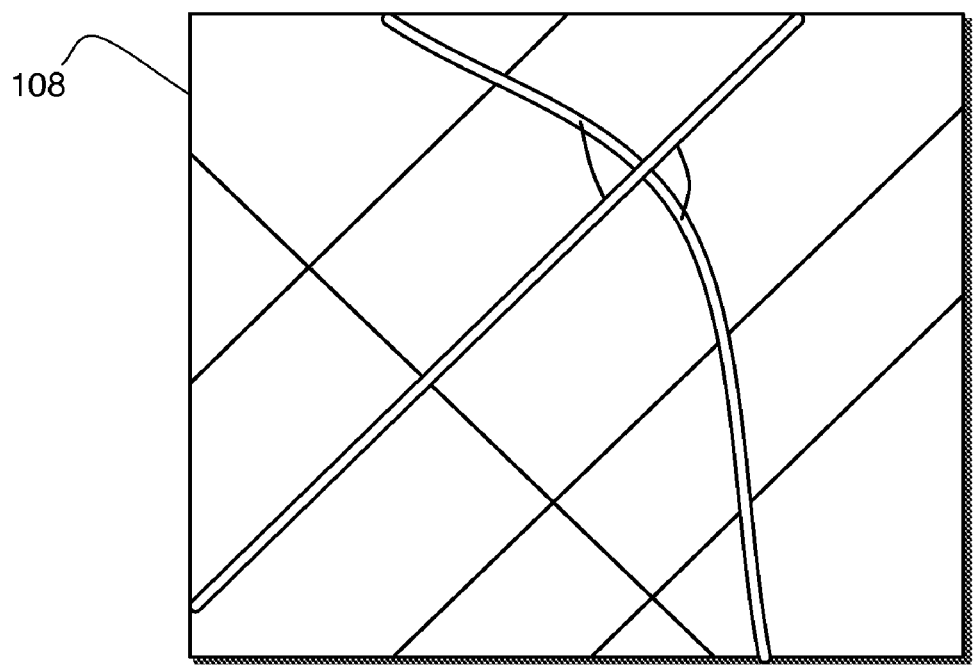
FIG. 3 is a display of another portion of the FIG. 1 display according to an embodiment.

FIG. 1 depicts a display 100 of a portion of a map 102 depicting a geographic region comprising two states 104, 105. A rural region 106 portion of map 102 is depicted in FIG. 2 as displayed at an enlarged level of detail. An urban region 108 portion of map 102 is depicted in FIG. 3 as displayed at an enlarged level of detail. Each of FIGS. 2 and 3 depicts a corresponding rural region 106 and urban region 108 comprising a set of roads in the region. As depicted, the map density of rural region 106 is less dense than the map density of urban region 108.

Figure 4:
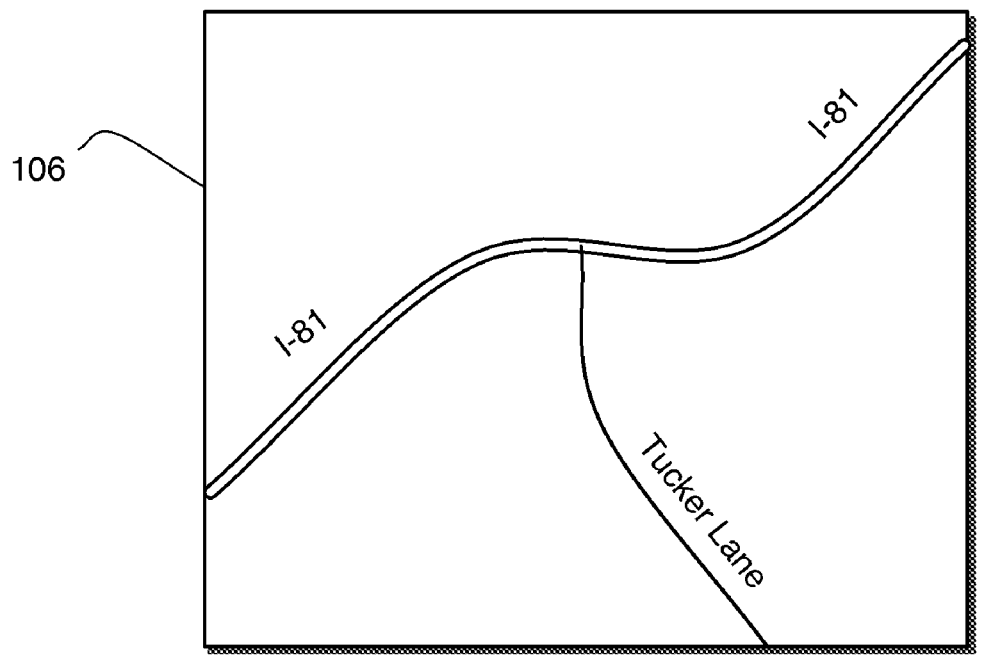
FIG. 4 is a display of the FIG. 2 display showing road text labels according to an embodiment.
Figure 5:
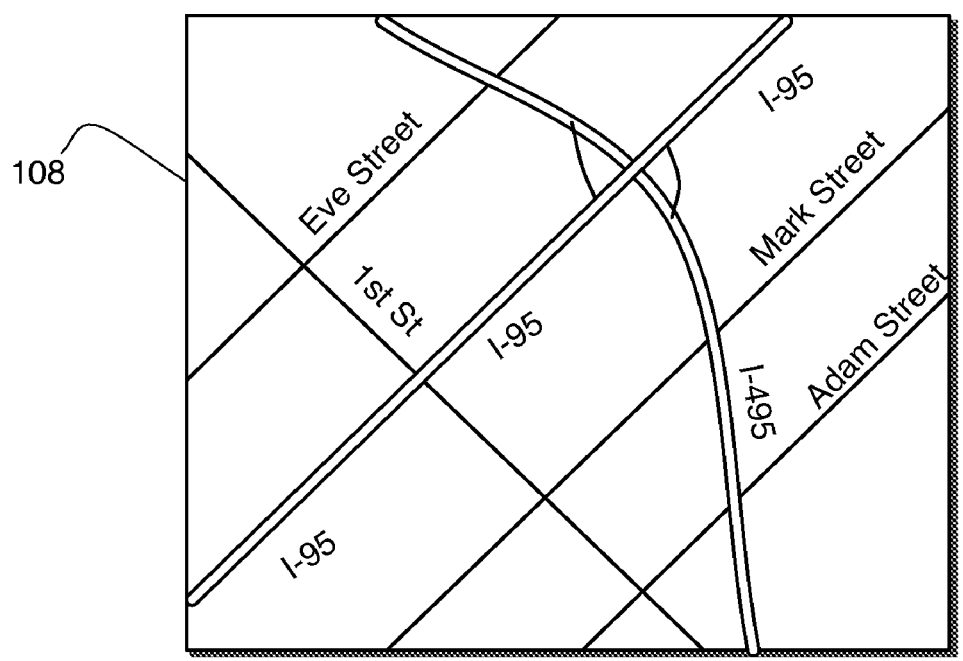
FIG. 5 is a display of the FIG. 3 display showing road text labels according to an embodiment.

FIGS. 4 and 5 depict, respectively, displayed maps of urban region 106 and rural region 108 comprising text labels applied to the displayed roads.

Figure 6:
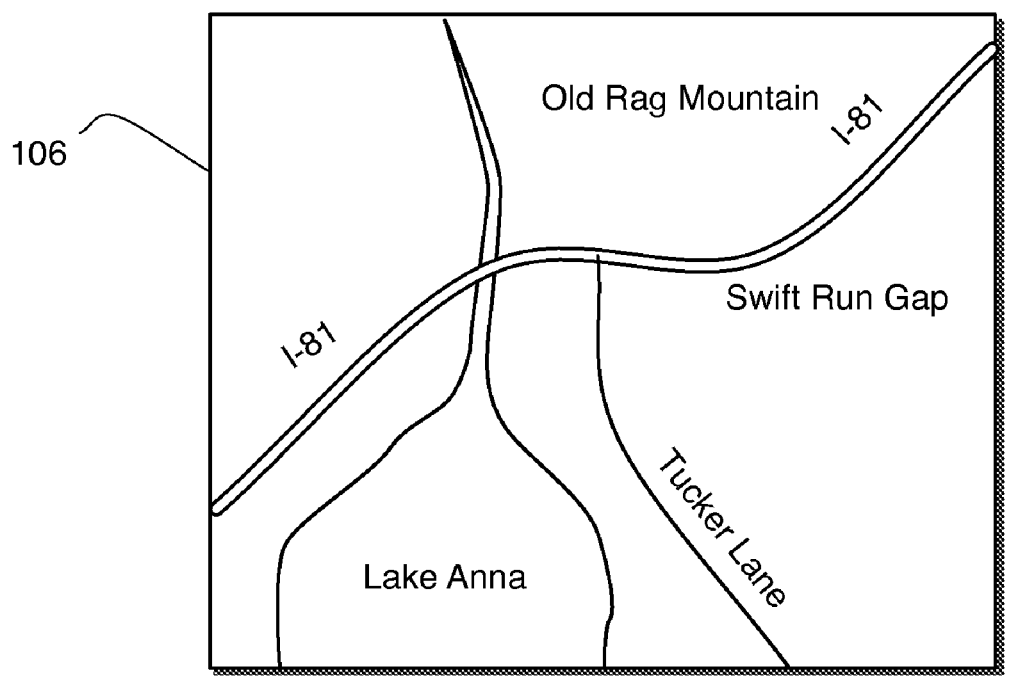
FIG. 6 is a display of the FIG. 2 display showing objects according to an embodiment.
Figure 7:
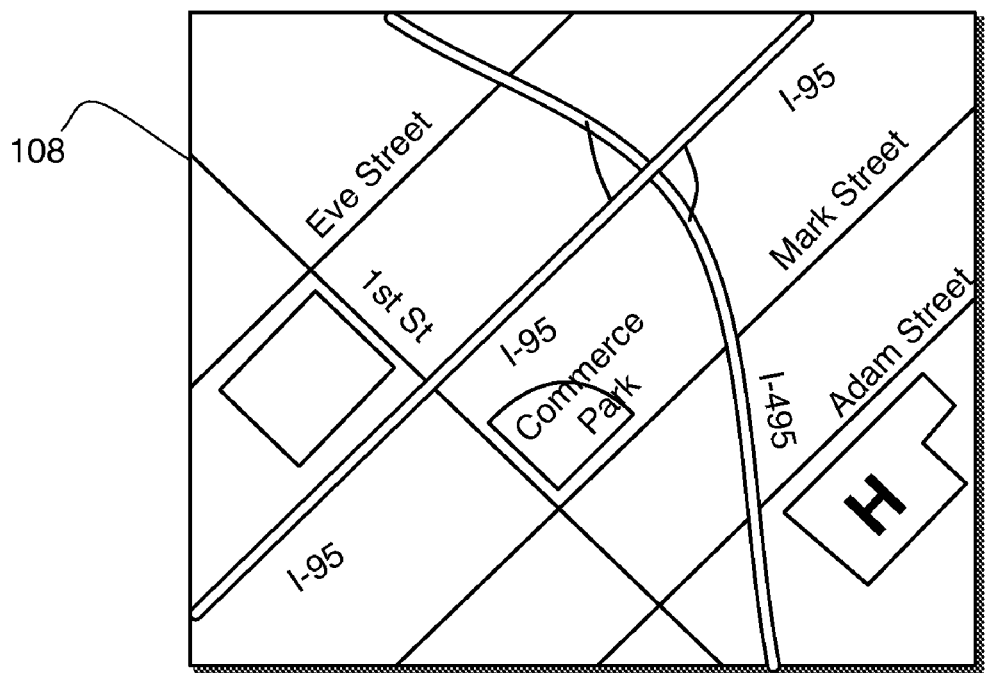
FIG. 7 is a display of the FIG. 3 display showing objects according to an embodiment.

FIGS. 6 and 7 depict, respectively, displayed maps of urban region 106 and rural region 108 comprising geographic and/or community features applied to the displayed roads. The two sample maps demonstrate the following map layers: Freeways, Freeway labels, Local streets, Local street labels, Lakes, Lake labels, Community feature and Community feature labels. To adjust map display density, layer visibility can be enabled or disabled layer by layer. In at least some embodiments, layers are enabled or disabled according to predefined relationships, e.g., a freeway label layer is disabled if freeway layer is disabled, etc.

One or more embodiments according to the present invention provide a method for automatically retaining a similar density of displayed map features by determining in real time which features should be displayed at a given location and zoom level. The automatic adjustment is performed, at least in part, by efficiently estimating map density for different possible combinations of map features and displaying a feature combination at or above a predetermined level. For example, different features as depicted in FIGS. 2-7 described above may be selectively applied to a displayed map to obtain a predetermined map density level.

1. Estimation of Map Density

One or more embodiments according to the present invention are based on the fact that many mapping systems use quad trees as a spatial index to speed up spatial queries. A quad tree is a tree-type data structure wherein each node of the tree comprises up to four child nodes in order to enable recursive partitioning of a two dimensional space, e.g., subdividing a space into four quadrants. In at least some embodiments, the nodes of a quad tree may be a different shape, e.g., squares, diamonds, parallelepipeds, etc.

FIG. 13a depicts a first level of a quad tree, i.e., a root node 1300 of the tree covering an entire mapping layer. FIG. 13b depicts a second level of a quad tree, i.e., root node 1300 having four child nodes 1301-1304. FIG. 13c depicts a third level of the quad tree, i.e., each child node 1301-1304 of root node 1300 having four child nodes 1305-1308, 1309-1312, 1313-1316, and 1317-1320, respectively.

Figure 14:
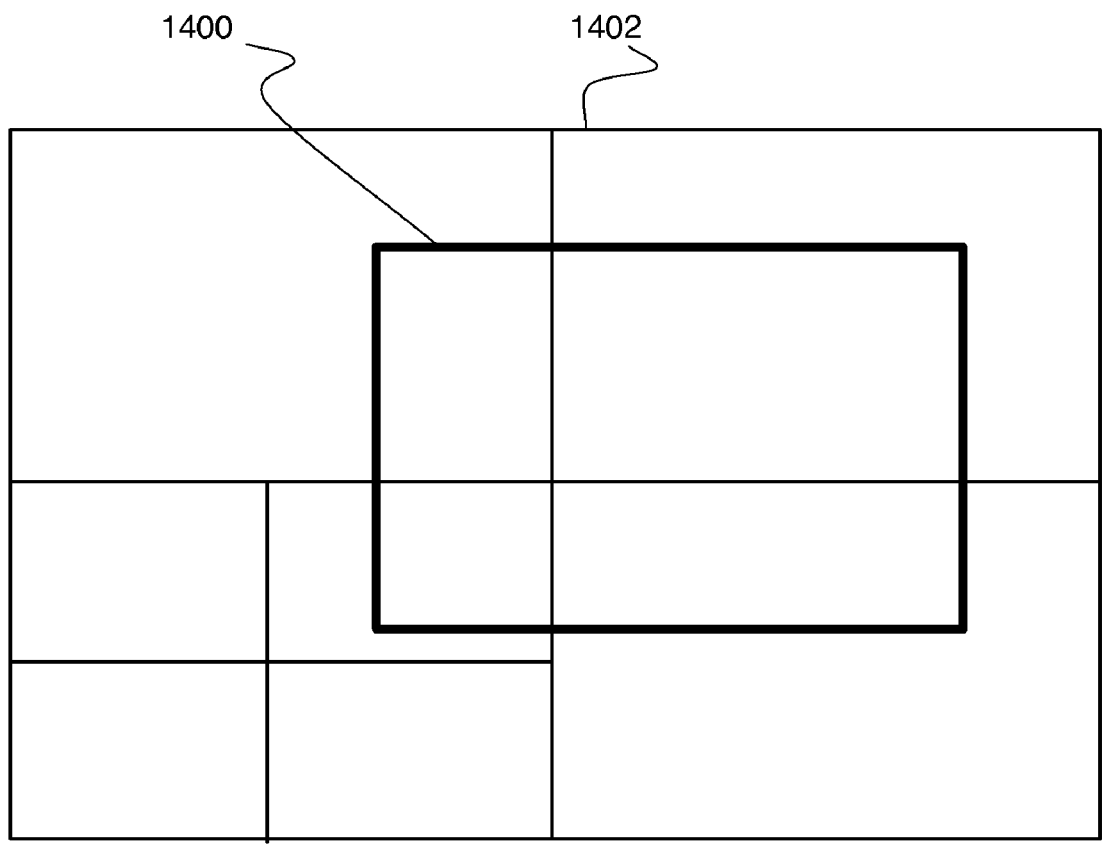
FIG. 14 is a diagram of a query rectangle overlaid on a quad tree according to an embodiment.
Figure 15:
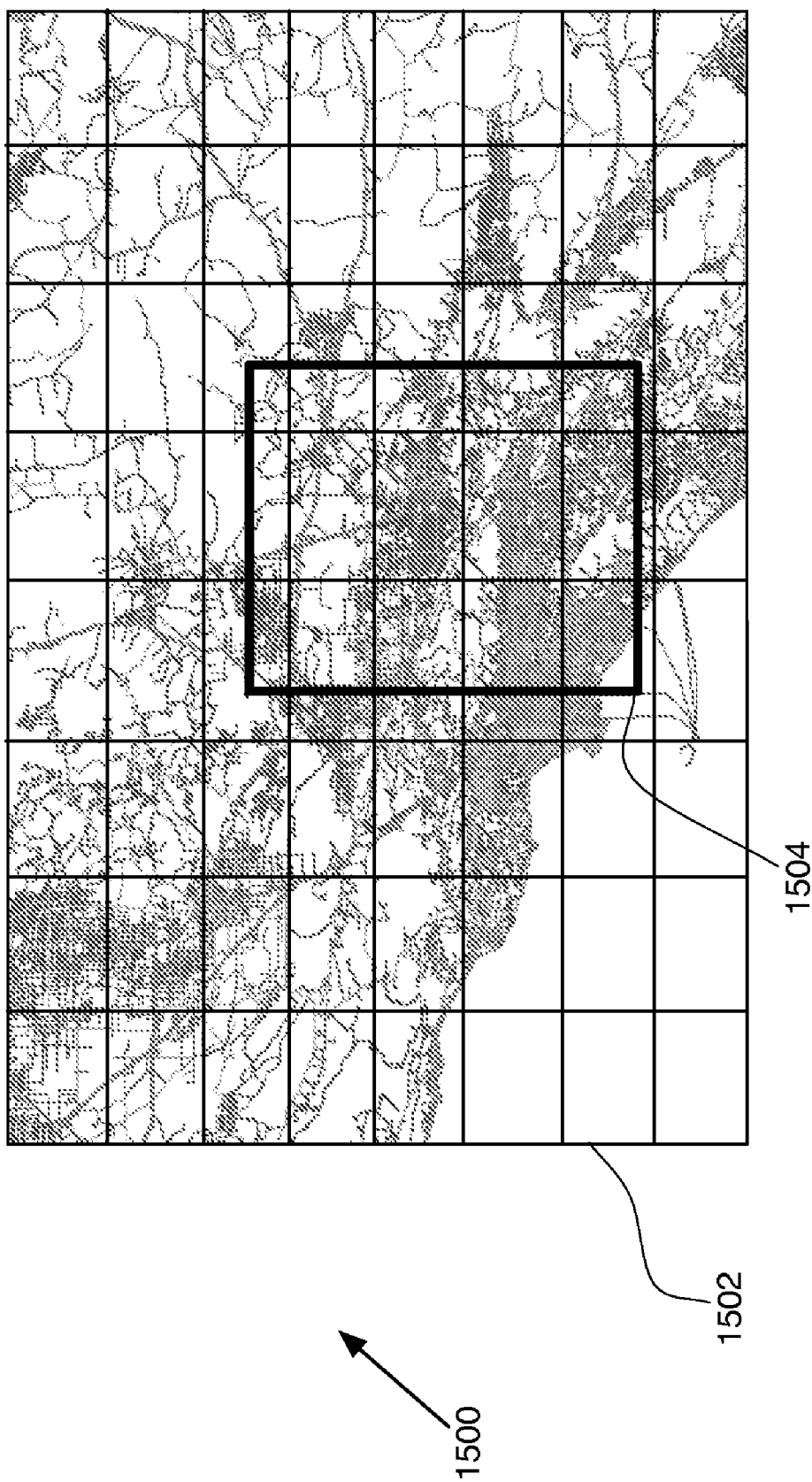
FIG. 15 is a diagram of a query rectangle overlaid on a map spatially indexed by a quad tree.

FIG. 14 depicts an area of interest, i.e., a query region (rectangle) 1400 (thick line), overlaid on quad tree 1402. For illustration purpose, nodes in the 3rd level of the quad tree are not completely expanded in this example. As depicted, query rectangle 1400 intersects with the root node of quad tree 1402, as well as, the four (4) child nodes of the second level of the quad tree and one child node of the third level of the quad tree. FIG. 15 depicts an exemplary map 1500 having a quad tree 1502 overlaid over the map. Darker portions of map 1500 correspond to increased density of roadways. A query rectangle 1504 is also overlaid on map 1500.

With the spatial index, all spatial objects are organized into a list of quads or cells with different spatial size and locations. Each quad comprises a group of objects. The quad also retains the size of the object data and/or the number of objects.

A spatial query, e.g., finding all objects intersecting with a rectangle, starts with first finding all quads intersecting with the rectangle. In at least some embodiments, user input, e.g., via a display and/or voice or other input mechanism, is received to determine a query rectangle. In at least some embodiments, the query rectangle may be determined based on a given map display and/or traversal of a path. Without checking individual objects, this operation is relatively fast. Prior to performing any spatial operations, all quads intersecting with a query rectangle may be determined and the data size within the query rectangle may be estimated with the process set forth in pseudo-code form in Listing 1.

Listing 1

```
EstimateDataSize (QueryRectangle)
{
    Find all quads intersecting with QueryRectangle
    Size = 0
    For each quad intersecting with QueryRectangle
    {
        if (quad is inside QueryRectangle) then
            Size += size of quad
        else
        {
            Size += <size of quad>*<intersecting area>/<quad area>
        }
    }
    return Size;
}
```

To obtain best performance, integers are used to calculate the data size of quads partially overlapping with the Query Rectangle. Mapping systems with a spatial index already have the function to find all quads intersecting with query rectangles.

After the size within a query rectangle is estimated, the size is used as the indicator of average map density inside the query rectangle. The size is relevant to the database coding schema, and the resolution of the map data. For a particular database format, experiments may be performed to set thresholds used to adjust spatial operations based on the size information. For the same database format, parameters may be set in different databases to fine tune the thresholds further.

Figure 8:
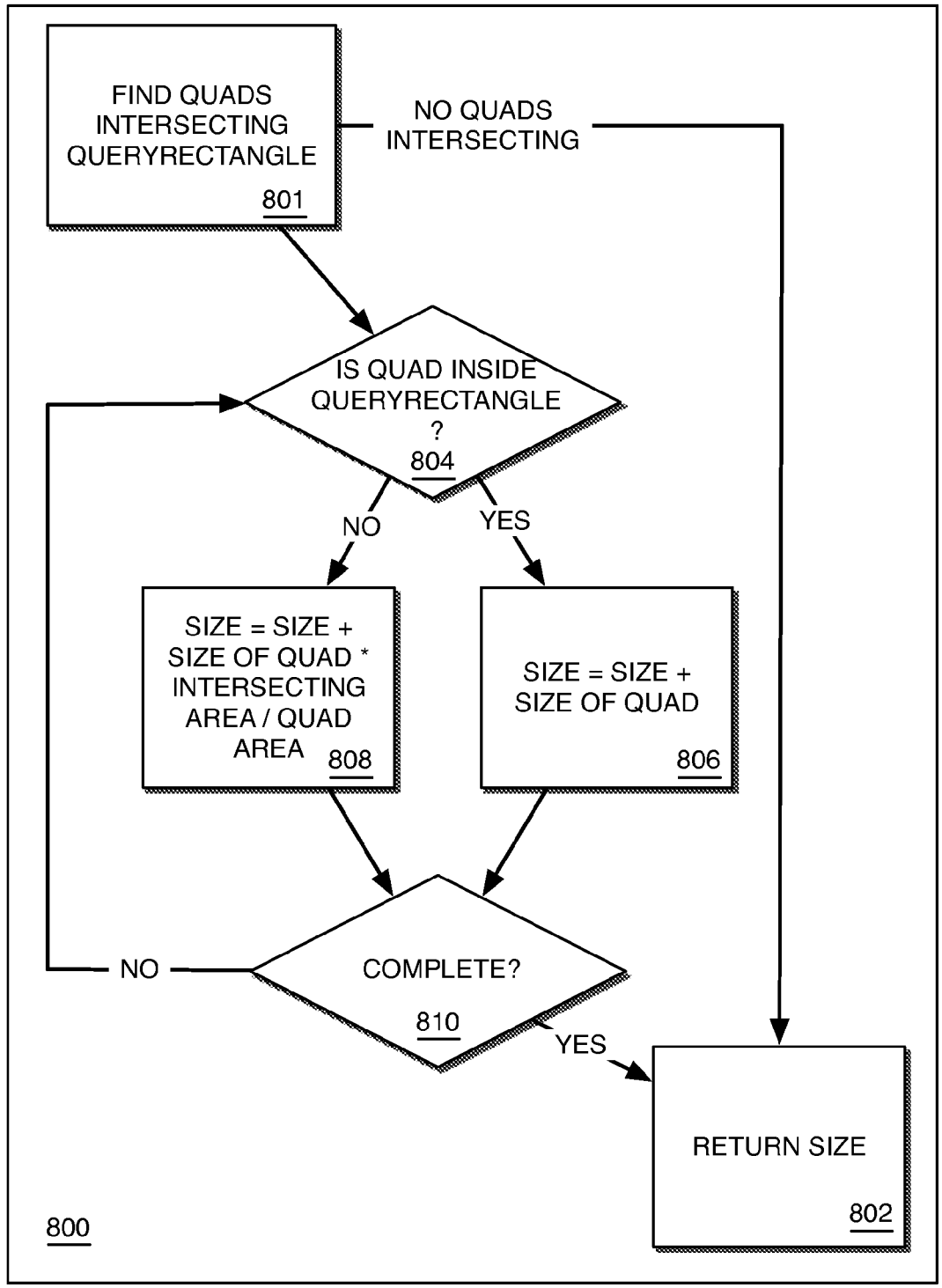
FIG. 8 is a high-level flow diagram of a portion of a sequence of instructions according to an embodiment.

FIG. 8 depicts a high-level process flow diagram of execution of a portion 800 of a sequence of instructions, similar to Listing 1, by a mobile device. The flow of control begins at find quad function 801. If no quads intersecting the QueryRectangle are found, the flow proceeds to return size function 802. If one or more quads intersecting the QueryRectangle are found, the flow proceeds to determine if the quad is inside the QueryRectangle at function 804.

If the outcome of function 804 is positive (YES), the flow proceeds to increment function 806 and the size is incremented by the size of the quad, e.g., an area value. If the outcome of function 804 is negative (NO), the flow proceeds to increment function 808 and the size is incremented by the size of the quad multiplied by the intersecting area divided by the quad area, e.g., the size is incremented by an amount proportional to the amount of overlap of the intersecting area.

After either of increment function 806, 808, the flow proceeds to complete determination function 810. Complete determination function 810 determines whether all quads intersecting the QueryRectangle have been included in the size determination. If the outcome of complete determination function 810 is positive (YES), the flow proceeds to return size function 802. If the outcome of complete determination function 810 is negative (NO), the flow proceeds to function 804 and evaluation of the next quad is performed as described above.

In at least some embodiments, after completion of the process flow portion 800, the determined size may be output to a memory, e.g., memory 1206, a register of processor 1204, etc., and/or an output device, e.g., a display 1208, a printer, another computer, etc.

2. Automatically Adjust Detail Level on Map Display

The above-described function estimates the map data size within a screen rectangle. With the present function, the pseudo-code of Listing 2 describes a process of adjusting detail level on the map screen.

Listing 2

```
nIteration = 0
while (1)
{
    density = EstimateDataSize (ScreenRectangle)
    if (density > nMaxDensity AND nIteration <
        nMaxIteration AND Other Constraints)
    {
        Adjust predefined map detail levels or adjust map layer visibility
    }
    else if (density < nMinDensity AND nIteration <
        nMaxIteration AND Other Constraints)
    {
        Adjust predefined map detail levels or adjust map layer visibility
    }
    else
        break;
    Increase nInteration by 1
}
Draw map on the screen
```

Figure 9:
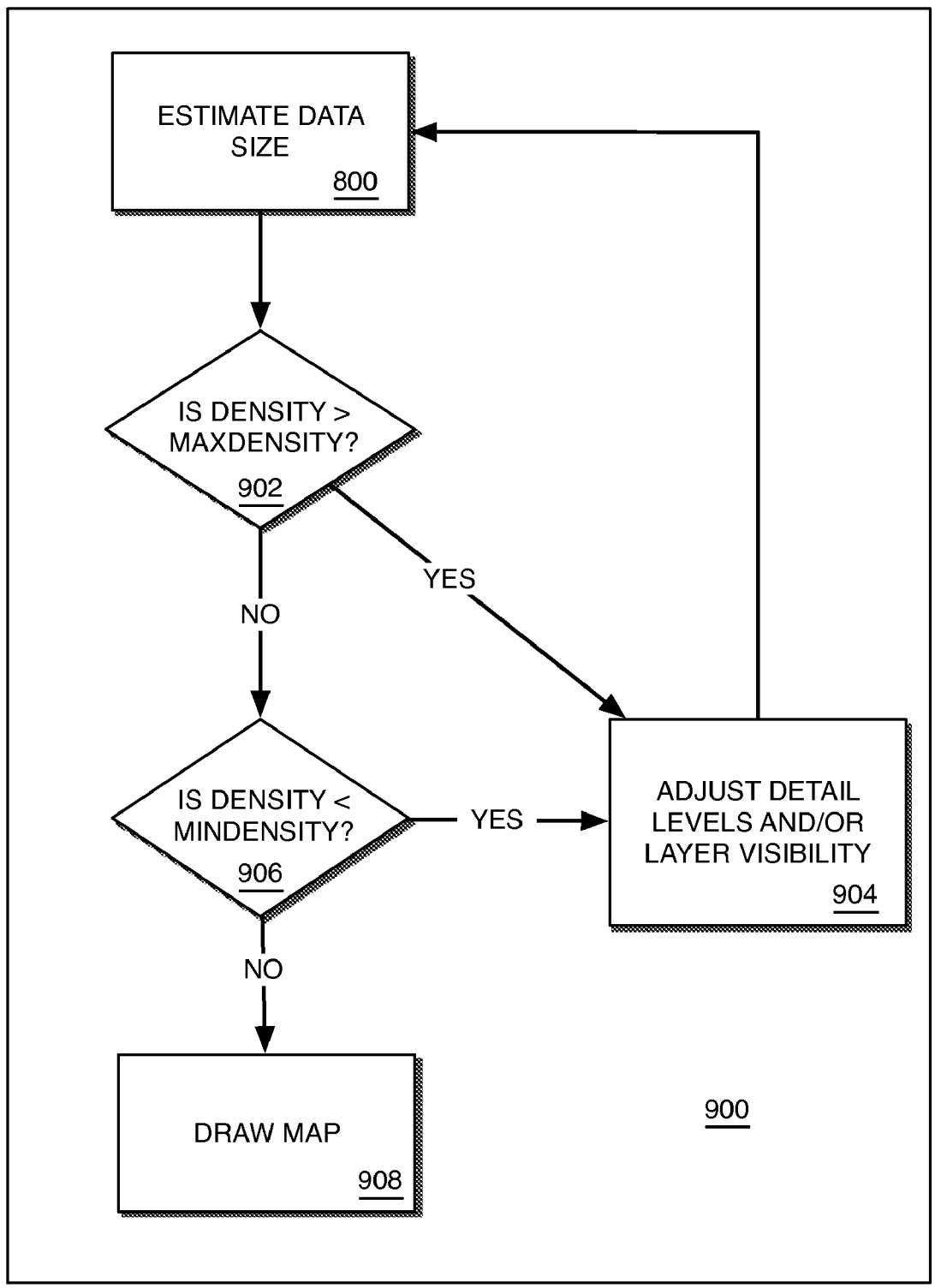
FIG. 9 is a high-level flow diagram of another portion of a sequence of instructions according to an embodiment.

FIG. 9 depicts a high-level process flow diagram of execution of a portion 900 of a sequence of instructions, similar to Listing 2, by a mobile device. The flow of control begins at estimate data size function 800 as described above with respect to FIG. 8, which estimates map density based on the selected map detail level and/or one or more visible map layers. The flow proceeds to maximum density comparison function 902 wherein the current map density is compared with a predetermined maximum map density. In one or more embodiments, additional comparisons may be made in comparison function 902, e.g., as indicated in Listing 2 a comparison of the number of iterations performed in portion 900 with respect to a maximum number of iterations to be performed for a given map.

If the current map density exceeds the predetermined maximum map density (positive outcome or YES), the flow proceeds to adjustment function 904. In adjustment function 904, the detail level and/or map layer visibilities may be adjusted to reduce the map density. In some embodiments, the detail levels or visibility of layers to be adjusted, may be predetermined at map creation. The flow then proceeds to return to estimate data size function 800.

If the current map density does not exceed the predetermined maximum map density (negative outcome or NO), the flow proceeds to minimum comparison determination function 906 wherein the current map density is compared with a predetermined minimum map density. In one or more embodiments, additional comparisons may be made in comparison function 906, e.g., as indicated in Listing 2 a comparison of the number of iterations performed in portion 900 with respect to a maximum number of iterations to be performed for a given map.

If the current map density falls below the predetermined minimum map density (positive outcome or YES), the flow proceeds to adjustment function 904. In adjustment function 904, the detail level and/or map layer visibilities may be adjusted to increase the map density. In some embodiments, the detail levels or visibility of layers to be adjusted, may be predetermined at map creation. The flow then proceeds to return to estimate data size function 800 with the newly adjusted map detail level and/or layer visibility.

If the current map density exceeds the predetermined minimum map density (negative outcome or NO), the flow proceeds to draw map function 908 wherein the map is drawn on a display screen.

3. Automatically Adjust Street Routing Algorithm

The functionality described in Listing 1 estimates the density of one or more selected map layers at a specific location. Adjusting the street routing criteria based on urban or rural areas based on map density, the routing performance and route quality may be significantly improved.

The pseudo-code of Listing 3 describes a process of automatically adjusting a street routing algorithm.

Listing 3

```
density = EstimateDataSize (QueryRectangle, selected layers)
if (density > MinUrbanDensity AND Other Constraints)
{
    Search routes with the criteria for urban areas
}
else
{
    Search routes with the criteria for rural areas
}
```

Figure 10:
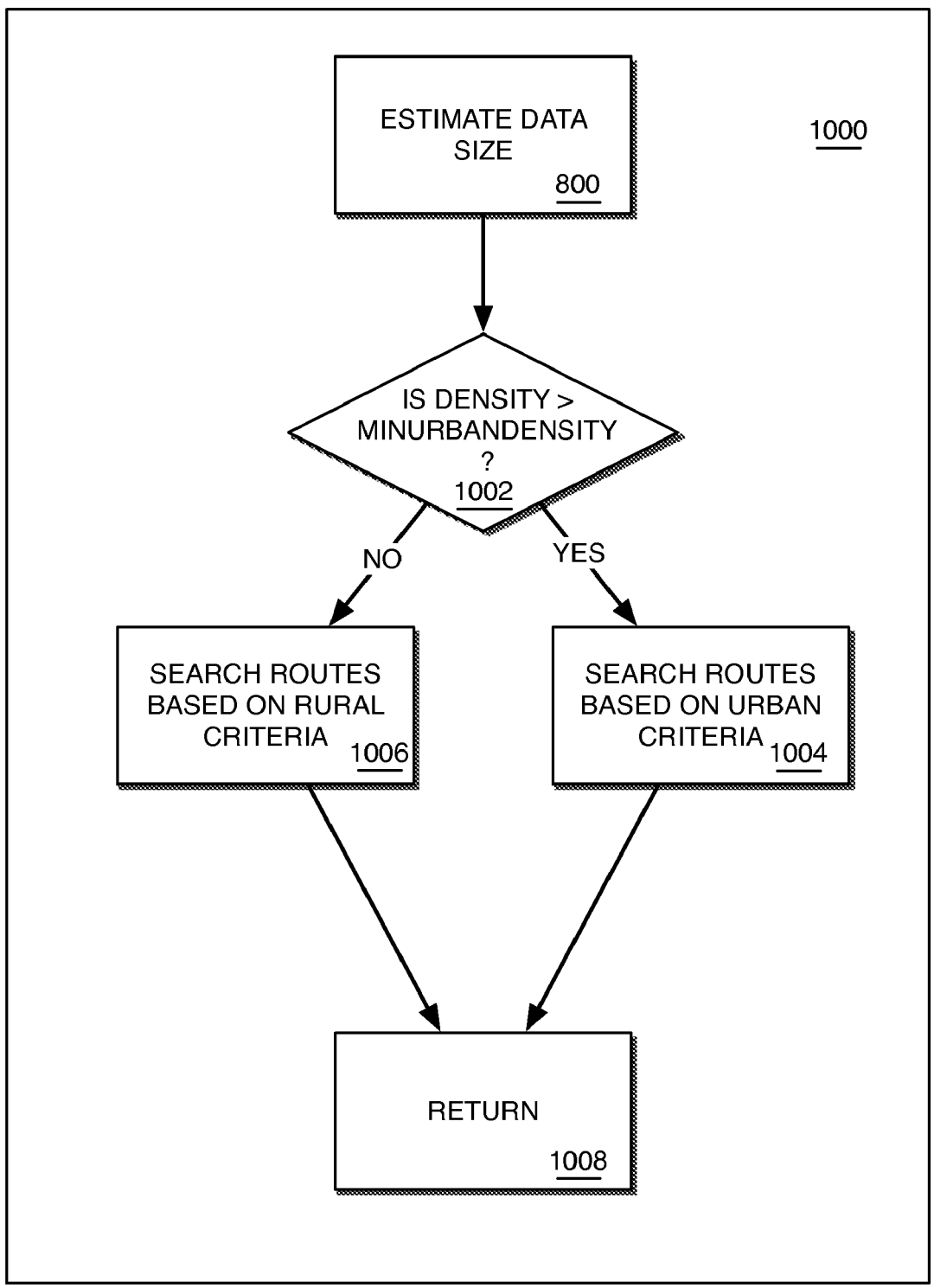
FIG. 10 is a high-level flow diagram of another portion of a sequence of instructions according to an embodiment.

FIG. 10 depicts a high-level process flow diagram of execution of a portion 1000 of a sequence of instructions, similar to Listing 3, by a mobile device. The flow of control begins at estimate data size function 800 as described above with respect to FIG. 8. To estimate data density of one or more selected layers, a QueryRectangle having a predefined size and centered at the location of interest is used. The flow proceeds to function 1002 wherein the current map density is compared with a predetermined minimum urban density. In one or more embodiments, additional comparisons may be made in determine function 1002.

If the current map density exceeds the predetermined minimum urban density (positive outcome or YES), the flow proceeds to urban route search function 1004. In urban route search function 1004, a route based on a user-determined and/or mobile device-determined source and destination is determined based on criteria for urban areas. Examples of such criteria comprise the minimal search distance before jumping to highways or freeways and estimated (heuristic) distance from current position to destination.

If the current map density does not exceed the predetermined minimum urban density (negative outcome or NO), the flow proceeds to rural route search function 1006 with criteria for rural areas. In rural route search function 1006, a route based on a user-determined and/or mobile device-determined source and destination is determined based on criteria for rural areas. Examples of such criteria comprise the minimal search distance before jumping to highways or freeways and estimated (heuristic) distance from current position to destination.

After a route is determined based on either of search rural route function 1006 and search urban route function 1004, the flow proceeds to return function 1008 and execution proceeds to perform other tasks.

4. Auto Adjustment of Nearest Search

With the data size estimate function 800 described in Listing 1, the search radius of nearest search may be adjusted automatically before the actual search is performed. This improves search performance and search result quality.

The pseudo-code of Listing 4 describes a process of automatically adjusting a nearest search algorithm.

Listing 4

```
nIteration =0
datasize = 0
Radius = initial Radius
while (datasize< MinDataSize AND nIteration < nMaxIteration)
{
    Enlarge Radius by 2
    QueryRectangle = bounding box of the circle centered at the
        reference point with Radius
    datasize = EstimateDataSize (QueryRectangle, selected layers)
    Increase nIteration by 1
}
NearestSearch (Radius, reference point)
```

Figure 11:
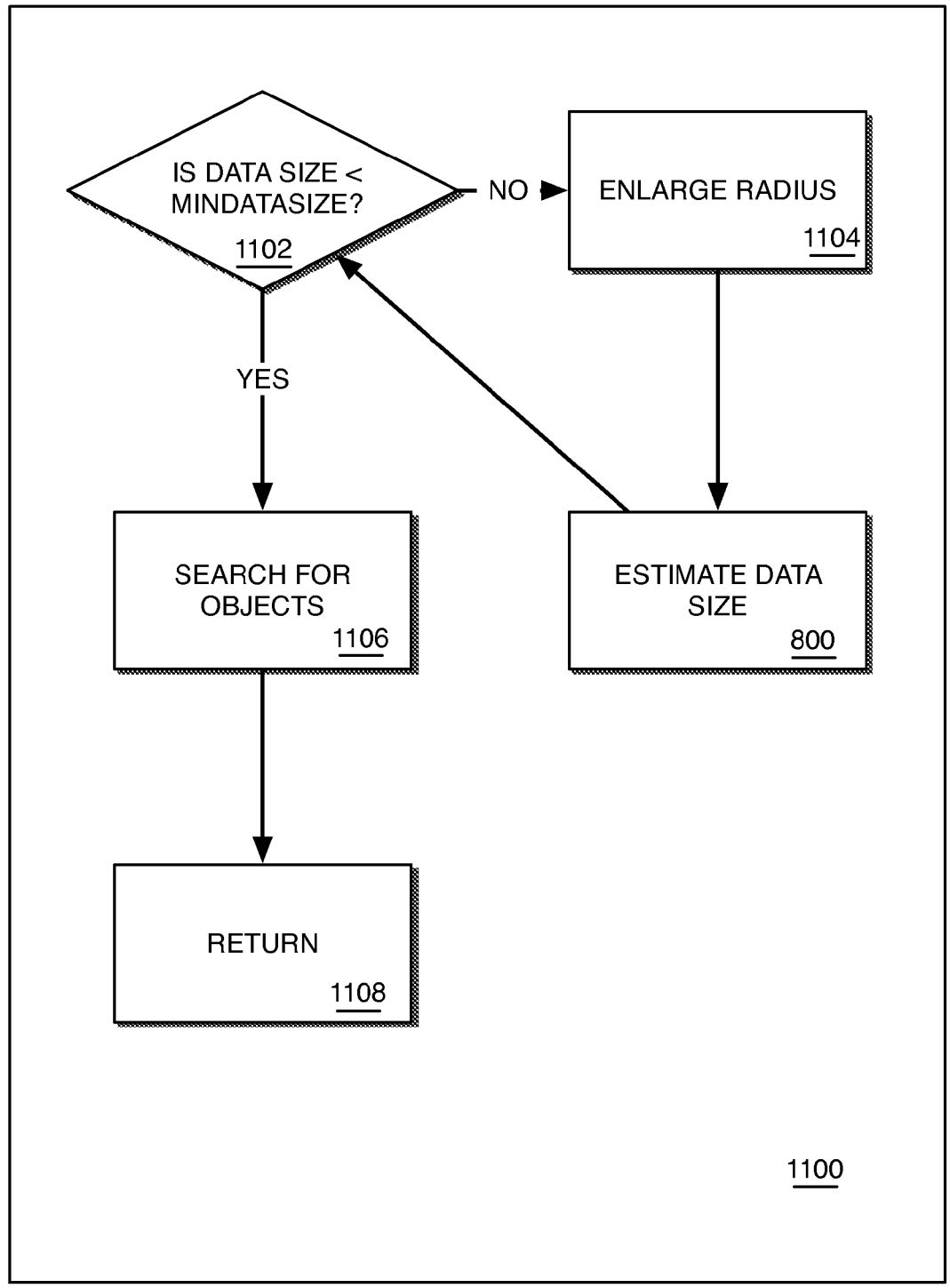
FIG. 11 is a high-level flow diagram of another portion of a sequence of instructions according to an embodiment.

FIG. 11 depicts a high-level process flow diagram of execution of a portion 1100 of a sequence of instructions, similar to Listing 4, by a mobile device. The flow of control begins at data size comparison function 1102 wherein the current map data size is compared to a predetermined minimum data size value. In one or more embodiments, the search Radius is set to a small initial value, and the initial map data size is set to a default value of zero at the beginning of the control flow. In one or more embodiments, data size comparison function 1102 comprises additional comparisons, e.g., a comparison of the number of iterations in which portion 1100 has been performed with respect to a predetermined maximum number of iterations. As depicted in Listing 4 above, portion 1100 completes if the predetermined maximum number of iterations has been exceeded.

If the current map data size does not exceed the predetermined minimum data size (negative outcome or NO), the flow proceeds to enlarge radius function 1104 wherein the search circle is increased in diameter, e.g., multiplied by 2. The QueryRectangle bounding the search circle is enlarged accordingly. The flow proceeds to estimate data size function 800 as described above with respect to FIG. 8 using the newly enlarged QueryRectangle. The flow then proceeds to return to data size comparison function 1102.

If the current data size exceeds the predetermined minimum data size (positive outcome or YES), the flow proceeds to nearest search function 1106 wherein a search of objects within the determined radius is performed. The flow then proceeds to return function 1108 and execution proceeds to perform other tasks.

Figure 12:
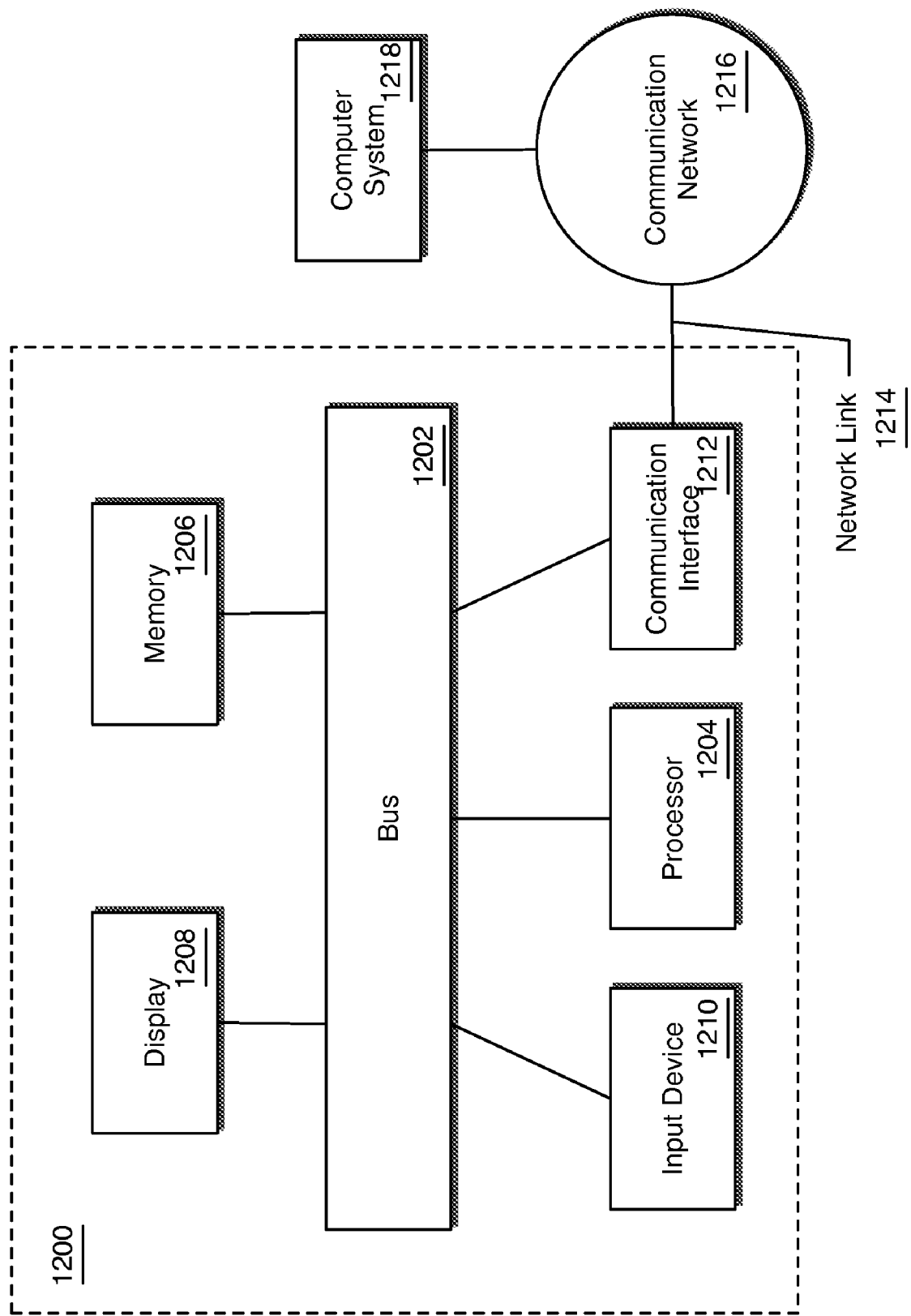
FIG. 12 is a high-level block diagram of a computer system usable in conjunction with an embodiment.

FIG. 12 is a block diagram illustrating an exemplary computer system 1200 upon which an embodiment may be implemented. Computer system 1200 includes a bus 1202 or other communication mechanism for communicating information, and a processor 1204 coupled with bus 1202 for processing information. Computer system 1200 also includes a memory 1206, such as a random access memory (RAM) or other dynamic storage device, coupled to the bus 1202 for storing instructions to be executed by processor 1204. Memory 1206 also may be used for storing temporary variables or other intermediate information during execution of instructions to be executed by processor 1204.

Computer system 1200 is coupled via bus 1202 to display 1208, such as a liquid crystal display (LCD) or other display technology, for displaying information to the user. Input device 1210, described above, is coupled to bus 1202 for communicating information and command selections to the processor 1204.

According to one embodiment, computer system 1200 operates in response to processor 1204 executing sequences of instructions contained in memory 1206 or communication interface 1212. Such instructions may be read into memory 1206 from a computer-readable medium or communication interface 1212.

Execution of the sequences of instructions contained in memory 1206 causes the processor 1204 to perform the process steps described above. In alternative embodiments, hardwired circuitry may be used in place of or in combination with computer software instructions to implement the embodiments. Thus, embodiments are not limited to any specific combination of hardware circuitry and software.

Computer system 1200 also includes a communication interface 1212 coupled to the bus 1202. Communication interface 1212 provides two-way data communication. For example, communication interface 1212 may be a wireless communication link. In any such implementation, communication interface 1212 sends and receives electrical, electromagnetic or optical signals which carry digital data streams representing various types of information.

Network link 1214 typically provides data communication through one or more networks to other devices. For example, network link 1214 may provide a connection through communication network 1216 to computer system 1200 or to data equipment operated by a service provider. The signals through the various networks and the signals on network link 1214 and through communication interface 1212, which carry the digital data to and from computer system 1200, are exemplary forms of carrier waves transporting the information.

Computer system 1200 can send messages and receive data, including program code, through the network(s), network link 1214 and communication interface 1212. Received code may be executed by processor 1204 as it is received, and/or stored in memory 1206 for later execution. In this manner, computer system 1200 may obtain application code in the form of a carrier wave.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A computer-implemented method of determining and utilizing an average density of a query region of a map, comprising:
    determining, using a computing device, one or more nodes of a quad tree applied to the map with which the query region intersects;
    calculating, using the computing device, a cumulative data size of the query region based on a data size of the one or more intersecting nodes;
    wherein calculating the cumulative data size comprises:
        adjusting the cumulative data size of the query region by an amount corresponding to a data size of at least one node enclosed by the query region; and
        adjusting the cumulative data size of the query region by an amount corresponding to a data size of a portion of the one or more intersecting nodes within the query region;
    determining, using the computing device, the average density of the query region based on a query region area and the cumulative data size; and
    automatically adjusting at least one of a detail level and a layer visibility of the query region of the map from corresponding to the average density to corresponding to a predetermined density while maintaining a zoom level of the map in order to maintain a quantity of features displayed on the map between a predetermined minimum density threshold and a predetermined maximum density threshold.

2. The method as claimed in claim 1, further comprising storing the average density of the query region to a memory.

3. The method as claimed in claim 1, further comprising outputting the average density of the query region to an output device.

4. The method as claimed in claim 1, further comprising:
    specifying the query region based on at least one of user input, and a predetermined map display.

5. The method as claimed in claim 1, wherein the query region is in rectangular form.

6. The method as claimed in claim 1, further comprising determining a map density for at least one of one or more detail levels of the map and enabling visibility of one or more map layers.

7. The method as claimed in claim 6, further comprising selecting one predefined detail level of the map according to the map density.

8. The method as claimed in claim 6, further comprising at least one of enabling visibility of one or more map layers and disabling visibility of one or more map layers.

9. The method as claimed in claim 6, further comprising:
    generating a map display based on the map density.

10. The method as claimed in claim 1, further comprising determining street routing quality criteria of the query region according to the average density.

11. The method as claimed in claim 10, wherein the route quality criteria comprise at least one of urban route criteria and rural route criteria.

12. The method as claimed in claim 10, wherein determining street routing quality criteria comprises selecting urban route criteria when the average density is greater than a predetermined minimum urban density.

13. The method as claimed in claim 10, wherein determining street routing quality criteria comprises selecting rural route criteria when the average density is less than a predetermined minimum urban density.

14. The method as claimed in claim 1, further comprising enlarging a search radius by a predetermined amount when the cumulative data size is smaller than a predetermined minimum data size.

15. The method as claimed in claim 14, further comprising searching for objects to be displayed within the enlarged search radius.

16. A mobile computer device for determining and utilizing an average density of a query region of a map, the device comprising:
    a processor;
    a memory communicatively coupled with the processor and comprising a set of instructions which, when executed by the processor, cause the processor to:
    determine one or more nodes of a quad tree applied to the map with which the query region intersects;
    calculate a cumulative data size of the query region based on a data size of the one or more intersecting nodes;
        wherein calculating the cumulative data size comprises:
        adjusting the cumulative data size of the query region by an amount corresponding to a data size of at least one node enclosed by the query region; and
    adjusting the cumulative data size of the query region by an amount corresponding to a data size of a portion of the one or more intersecting nodes within the query region; and determine the average density of the query region based on a query region area and the cumulative data size; and automatically adjust at least one of a detail level and a layer visibility of the query region of the map from corresponding to the average density to corresponding to a predetermined density while maintaining a zoom level of the map in order to maintain a quantity of features displayed on the map between a predetermined minimum density threshold and a predetermined maximum density threshold.

17. The mobile computer device as claimed in claim 16, further comprising instructions which, when executed by the processor, cause the processor to store the determined query region density to the memory.

18. A memory storing instructions which, when executed by a processor, cause the processor to determine one or more nodes of a quad tree applied to a map with which a predetermined query region intersects; calculate a cumulative data size of the query region based on a data size of the one or more intersecting nodes, wherein calculating the cumulative data size comprises adjusting the cumulative data size of the query region by an amount corresponding to a data size of at least one node enclosed by the query region; and adjusting the cumulative data size of the query region by an amount corresponding to a data size of a portion of the one or more intersecting nodes within the query region; determine an average density in the query region based on a query region area and the cumulative data size; and adjust at least one of a detail level and a layer visibility of the query region of the map from corresponding to the average density to corresponding to a predetermined density while maintaining a zoom level of the map in order to maintain a quantity of features displayed on the map between a predetermined minimum density threshold and a predetermined maximum density threshold.

19. The memory as claimed in claim 18, further storing instructions which, when executed by the processor, cause the processor to determine street routing quality criteria of the query region according to the average density.

20. The memory as claimed in claim 19, wherein the instructions which cause the processor to determine the street routing quality criteria comprise instructions which, when executed by a processor, cause the processor to determine at least one of urban route criteria and rural route criteria.

21. The memory as claimed in claim 19, wherein the instructions which cause the processor to determine the street routing quality criteria comprise instructions which, when executed by a processor, select urban route criteria when the average density is greater than a predetermined minimum urban density.

22. The memory as claimed in claim 19, wherein the instructions which cause the processor to determine the street routing quality criteria comprise instructions which, when executed by a processor, select rural route criteria when the average density is less than a predetermined minimum urban density.

23. The memory as claimed in claim 18, further storing instructions which, when executed by the processor, cause the processor to enlarge a search radius by a predetermined amount when the cumulative data size is smaller than a predetermined minimum data size.

24. The memory as claimed in claim 23, further storing instructions which, when executed by the processor, cause the processor to search for objects to be displayed within the enlarged search radius.

25. The method as claimed in claim 1, wherein automatically adjusting the at least one of the detail level and the layer visibility of the query region of the map is performed in real time according to the determined average density of the query region.

26. The mobile computer device as claimed in claim 16, wherein the processor automatically adjusts the at least one of the detail level and the layer visibility of the query region of the map in real time according to the determined average density of the query region.

27. The memory as claimed in claim 18, wherein the processor adjusts the at least one of the detail level and the layer visibility of the query region of the map in real time according to the determined average density of the query region.

* * * * *